(12) United States Patent
Tanaka et al.

(10) Patent No.: US 7,704,625 B2
(45) Date of Patent: Apr. 27, 2010

(54) FUEL CELL

(75) Inventors: Hiroyuki Tanaka, Utsunomiya (JP); Narutoshi Sugita, Utsunomiya (JP); Tadashi Nishiyama, Shioya-gun (JP); Takaki Nakagawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 810 days.

(21) Appl. No.: 10/835,670

(22) Filed: Apr. 30, 2004

(65) Prior Publication Data
US 2004/0219410 A1    Nov. 4, 2004

(30) Foreign Application Priority Data

May 1, 2003    (JP)    ............... 2003-126551
May 1, 2003    (JP)    ............... 2003-126561

(51) Int. Cl.
*H01M 2/08*    (2006.01)
*H01M 2/14*    (2006.01)
*H01M 8/10*    (2006.01)

(52) U.S. Cl. ............... 429/35; 429/38; 429/36; 429/39; 429/32

(58) Field of Classification Search ............... 429/32, 429/35, 36, 38, 39
See application file for complete search history.

(56) References Cited

U.S. PATENT DOCUMENTS

| | | | | |
|---|---|---|---|---|
| 5,736,269 | A * | 4/1998 | Okamoto et al. | 429/32 |
| 6,410,179 | B1 * | 6/2002 | Boyer et al. | 429/39 |
| 6,686,085 | B1 | 2/2004 | Fujii et al. | |
| 7,014,939 | B2 | 3/2006 | Suenaga et al. | |
| 2002/0102453 | A1 * | 8/2002 | Suenaga et al. | 429/37 |
| 2002/0122970 | A1 | 9/2002 | Inoue et al. | |
| 2002/0127461 | A1 | 9/2002 | Sugita et al. | |
| 2002/0192532 | A1 | 12/2002 | Inagaki et al. | |
| 2003/0049507 | A1 * | 3/2003 | Sugita et al. | 429/26 |
| 2003/0087140 | A1 * | 5/2003 | Kikuchi et al. | 429/26 |

FOREIGN PATENT DOCUMENTS

DE    10015360 A1    10/2001

(Continued)

OTHER PUBLICATIONS

German Office Action, Serial No. 10 2004 021 253.8-45, dated Jul. 27, 2006.

(Continued)

*Primary Examiner*—Patrick Ryan
*Assistant Examiner*—Helen O Chu
(74) *Attorney, Agent, or Firm*—Lahive & Cockfield, LLP; Anthony A. Laurentano

(57) ABSTRACT

Flow guides forming an inlet channel are formed on a surface of a metal separator of a fuel cell. The flow guides overlap a section of an outer seal provided on the other surface of the metal separator. When a load is applied to the flow guides and the overlapping section in a stacking direction of the fuel cell, the flow guides and the overlapping section are deformed substantially equally in the stacking direction to the same extent. The line pressure of the flow guides and the line pressure of the overlapping section are substantially the same. The seal length L1 of the flow guides and the seal length L2 of the overlapping section are substantially the same.

6 Claims, 13 Drawing Sheets

FOREIGN PATENT DOCUMENTS

| | | |
|---|---|---|
| DE | 10203174 A1 | 9/2002 |
| EP | 1239529 A2 | 9/2002 |
| EP | 1302996 A2 | 4/2003 |
| JP | 6-89728 | 3/1994 |
| JP | 7-249417 | 9/1995 |
| JP | 08-148169 | 6/1996 |
| JP | 10-74530 | 3/1998 |
| JP | 2001-148252 | 5/2001 |
| JP | 2001-266910 | 9/2001 |
| JP | 2001-266911 | 9/2001 |
| JP | 2002-15751 | 1/2002 |
| JP | 2002-25587 | 1/2002 |
| JP | 2002-100380 | 4/2002 |
| JP | 2002-237317 | 8/2002 |
| JP | 2002-270202 | 9/2002 |
| JP | 2003-31236 | 1/2003 |
| JP | 2003-77499 | 3/2003 |
| JP | 2003-197224 | 7/2003 |

OTHER PUBLICATIONS

Japanese Office Action for Application No. 2003-126551, dated Jan. 8, 2008.

Japanese Office Action for Application No. 2003-126561, dated Jan. 8, 2008.

* cited by examiner

FUEL CELL

BACKGROUND OF THE INVENTION

1. Field of the Invention

The present invention relates to a fuel cell formed by stacking a plurality of power generation cells. Each of the power generation cells includes an electrolyte electrode assembly and separators sandwiching the electrolyte electrode assembly. The electrolyte electrode assembly includes a pair of electrodes, and an electrolyte interposed between the electrodes. The fuel cell has an internal manifold including reactant passages and a coolant passage. The reactant passages and the coolant passage extend through the power generation cells in the stacking direction, and are connected to reactant flow fields and a coolant flow field, respectively.

2. Description of the Related Art

For example, a solid polymer fuel cell employs a membrane electrode assembly (MEA) which includes two electrodes (anode and cathode), and an electrolyte membrane interposed between the electrodes. The electrolyte membrane is a polymer ion exchange membrane. The membrane electrode assembly and separators sandwiching the membrane electrode assembly make up a unit of a power generation cell for generating electricity. A predetermined number of the power generation cells are stacked together to form a stack of the fuel cell.

In the power generation cell, a fuel gas such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. A gas chiefly containing oxygen (oxygen-containing gas) or air is supplied to the cathode. At the cathode, the hydrogen ions from the anode combine with the electrons and oxygen to produce water.

Various sealing structures are used for preventing the leakage of the fuel gas and the oxygen-containing gas in the power generation cell. For example, a sealing structure disclosed in Japanese laid-open patent publication No. 8-148169 uses a conventional O-ring. FIG. 11 shows the sealing structure of Japanese laid-open patent publication No. 8-148169. A membrane electrode assembly 3 includes an anode 2a, a cathode 2b, and an electrolyte membrane 1 interposed between the anode 2a and the cathode 2b. The membrane electrode assembly 3 is sandwiched between the separators 4a, 4b. O-rings 5a, 5b are provided between the separators 4a, 4b around the electrolyte membrane 1.

Typically, in the power generation cell, an oxygen-containing gas flow field (reactant gas flow field) is provided on a surface of the separator facing the cathode for supplying the oxygen-containing gas (reactant gas) to the cathode, and a fuel gas flow field (reactant gas flow field) is provided on a surface of the separator facing the anode for supplying the fuel gas (reactant gas) to the anode. Further, a coolant flow field is provided between the separators for cooling the power generation cells.

The fuel cell has an internal manifold structure in which a fuel gas supply passage and a fuel gas discharge passage (reactant gas passages) connected to the fuel gas flow field, an oxygen-containing gas supply passage and an oxygen-containing gas discharge passage (reactant gas passages) connected to the oxygen-containing gas flow field, and a coolant supply passage and a coolant discharge passage connected to the coolant flow field extend through outer regions of the separators in the stacking direction.

The reactant gas flow field may be connected to the reactant gas flow passages by connection channels formed by seal members. For example, in FIG. 12, a reactant gas flow field 7a is formed on a surface 6a of a separator 6 along a power generation surface, and a reactant gas passage 7b extends through the separator 6 in the stacking direction.

A seal member 8 is provided on the surface 6a of the separator 6. The seal member 8 includes connection sections 8a separately provided at an area connecting the reactant gas flow field 7a and the reactant gas passage 7b. The reactant gas flows through connection grooves 7c between the separate connection sections 8a. A seal member 9 is provided on the other surface 6b of the separator 6 for sealing the coolant flow field (not shown).

The seal members 8 and 9 prevent the leakage of the reactant gas and the coolant. Further, the load balance in the surface of the power generation cell should be uniform, and the load balance should not change depending on the power generation cell in order to achieve the uniform, and the stabilized power generation performance in each of the power generation cells. In particular, the pressure applied to the power generation cell should be kept at the desired level to stabilize the power generation performance. Further, each of the power generation cells should have a uniform space in the flow field so that the cross sectional area of the flow field does not change depending on the power generation cell, and the uniform flow rates of the reactant gas distributed from the reactant gas passage 7b and the coolant distributed from the coolant passage 7d can be achieved.

According to the structure shown in FIG. 12, the connection grooves 7c between the reactant gas flow field 7a and the reactant gas passage 7b are formed by the separate connection sections 8a of the seal member 8. On the other surface opposite to the surface 6a, a section 9a of the seal member 9 extend along the sections 8a continuously. Therefore, when a load in a stacking direction is applied to the connecting sections 8a on the surface 6a and the section 9a which is provided on opposite surface, the connection sections 8a and the section 9a are not deformed uniformly. Thus, the height difference between the connection sections 8a of the seal member 8 and the section 9a of the seal member 9 occurs. Therefore, the cross sectional areas of the reactant gas channels in the seal members 8, 9 are not uniform. Consequently, the seal performance may not be good, and the reactant gas can not be supplied smoothly to the flow field due to the undesirable closure of the gas channels.

When thin metal separators are used, the balance of the line pressure (load) is not uniform, and the separators tend to be deformed in the stacking direction. Thus, the pressure is applied to the sealing surface or the power generation surface excessively or insufficiently. As a result, it is difficult to achieve the desired power generation performance with the simple structure.

FIG. 13 shows a solid polymer fuel cell stack disclosed in Japanese laid-open patent publication No. 2001-266911. For example, an oxygen-containing gas flow field S2 for supplying a reactant gas such as an oxygen-containing gas is formed in a serpentine pattern on a surface of a separator S1. The oxygen-containing gas flow field S2 is connected to an oxygen-containing gas supply passage S3 and an oxygen-containing gas discharge passage S4 which extend through outer regions of the separator S1 in the stacking direction. A packing S5 is attached to the separator S1 for connecting the oxygen-containing gas flow field S2 and the oxygen-containing gas passages S3 and S4, and preventing leakage of the reactant gas to the other fluid passages.

Stainless steel plates (SUS plate) S7 are provided to cover the connection channels S6a, S6b for connecting the oxygen-containing gas passages S3, S4, and the oxygen-containing gas flow field S2. The stainless plates S7 have a rectangular shape, and having ears S7a, S7b at two positions, respectively. The ears S7a, S7b are fitted to the steps S8 formed on the separator S1.

According to the disclosure of Japanese laid-open patent publication No. 2001-266911, the stainless steel plates S7 cover the connection channels S6a, S6b. Therefore, the polymer membrane (not shown) and the packing S5 are not deformed into the oxygen-containing gas flow field S2. The desired sealing performance is maintained, and the significant pressure loss of the reactant gas is prevented.

However, in the structure of Japanese laid-open patent publication No. 2001-266911, the stainless steel plate S7 is attached to each of the connection channels S6a, S6b of the separator S1. The operation of attaching the stainless steel plate S7 to each of the connection channels S6a, S6b is laborious. When several tens to several hundreds of the power generation cells are stacked to form the fuel cell, the attaching operation of the stainless steel plate S7 is very laborious, time consuming, and thus, the production cost is large.

The stainless steel plates S7 are attached to the connection channels S6a, S6b. Therefore, the width of the connection channels S6a, S6b needs to be larger than the width of the stainless steel plates S7. The surface area of the electrode is not used efficiently. It is not suitable to produce a compact and light fuel cell.

SUMMARY OF THE INVENTION

A general object of the present invention is to provide a fuel cell in which seal members on both surfaces of a separator are deformed substantially equally to the same extent, and the desired sealing performance and the desired power generation performance are achieved.

A main object of the present invention is to provide a fuel cell with an economical and compact structure in which assembling operation of the fuel cell is performed simply, and the desired sealing performance and the desired power generation performance are achieved.

According to the present invention, a fuel cell is formed by stacking power generation cells each including an electrolyte electrode assembly and separators sandwiching the electrolyte electrode assembly. The electrolyte electrode assembly includes first and second electrodes and an electrolyte interposed between the first and second electrodes. A reactant gas flow field is formed along an electrode surface for supplying a reactant gas through the reactant gas flow field. A coolant flow field is formed between the power generation cells for supplying a coolant through the coolant flow field. A reactant gas passage extends through the power generation cells, and is connected to the reactant gas flow field. A coolant passage extends through the power generation cells, and is connected to the coolant flow field.

A first seal is provided on one surface of the separator for sealing the reactant gas flow field. A second seal is provided on the other surface of the separator for sealing the coolant flow field.

The second seal includes a flow guide connecting the coolant flow field and the coolant passage, and the flow guide overlaps a section (overlapping section) of the first seal such that the separator is sandwiched between the flow guide and the overlapping section of the first seal. When a load is applied to the flow guide and the overlapping section in the stacking direction, the flow guide and the overlapping section are substantially equally deformed in the stacking direction to the same extent.

The first seal includes a flow guide connecting the reactant gas flow field and the reactant gas passage, and the flow guide overlaps a section (overlapping section) of the second seal such that the separator is sandwiched between the flow guide and the overlapping section of the second seal. When a load is applied to the flow guide and the overlapping section in the stacking direction, the flow guide and the overlapping section are substantially equally deformed in the stacking direction to the same extent.

Thus, the first seal and the second seal on both surfaces of the separator are substantially equally deformed to the same extent. The load is uniformly applied in the surface of the power generation cell. The load balance does not change depending on the power generation cell. Thus, the stabilized power generation performance can be achieved. The flow rates of the reactant gases and the coolant are uniform. The stabilized power generation performance is achieved in each of the power generation cells.

The electrolyte electrode assembly includes the first and second electrodes and the electrolyte membrane interposed between the first and second electrodes. The surface area of the first electrode is smaller than the surface area of the second electrode.

The first seal includes an inner seal provided between the electrolyte membrane and the separator, and an outer seal provided between adjacent separators. The second seal includes an inner seal corresponding to the inner seal of the first seal, and an outer seal corresponding to the outer seal of the first seal. With this structure, the strength of the power generation cell can be improved, and the thin power generation cell can be produced.

The line pressure of the flow guides and the line pressure of the overlapping section are substantially the same, i.e., the pressure load applied to the flow guides per unit length, and the pressure load applied to the overlapping section per unit length are substantially the same. The seal length of the flow guides and the seal length of the overlapping section are substantially the same. With the simple structure, the space in the power generation cell is provided uniformly, and the space between the power generation cells is provided uniformly. The reactant gas and the coolant flow through the connection channels smoothly, and the desired sealing performance in the power generation cell is achieved.

The flow guides are oriented perpendicular to the overlapping section. The length of the flow guides is larger than the seal width of the overlapping section. With the simple structure, when a load is applied to the first and second seals, the first and second seals are deformed substantially equally to the same extent.

According to the present invention, a first seal member is provided integrally on both surfaces of, and around an outer region of one of the separators, and the second seal member is provided integrally on both surfaces of, and around an outer region of the other of the separators. The first seal member and the second seal member are in contact with each other, and a channel connecting the reactant gas flow field and the reactant gas passage is formed between the first seal member and the second seal member.

The first seal member and the second seal member are in contact with each other to form the channel between the reactant gas flow field and the reactant gas passage. For example, the channel may be defined between a planar seal and a ridge-shaped seal, between ridge-shaped seals, between a planar seal and a circular or rectangular boss, or between bosses.

The first seal member and the second seal member function as the channel for connecting the reactant gas flow field and the reactant gas passages. Thus, dedicated metal plates such as the conventional stainless steel plate (SUS plate) are not required. It is not required to perform attaching operation of the metal plate. Thus, the fuel cell is assembled simply, and produced at a low cost, while the desired sealing performance is achieved. The size of the channel is small. Therefore, the surface area of the power generation cell is used efficiently, and the power generation in the fuel cell is performed efficiently.

The channel is defined by a plurality of flow guides provided integrally with at least one of the first and second seal members, at a position between the reactant flow field and the reactant gas passage. With the simple and economical structure, the power generation cell achieves the desired sealing performance and the desired power generation performance. The flow guides function as back support members for maintaining the pressure applied to the other seal at the required level for sealing.

The first seal member and the second seal member are in contact with each other, and a channel connecting the coolant flow guide and the coolant passage is formed between the first seal member and second seal member. The first seal member and the second seal member function as the channel for connecting the coolant flow field and the coolant passages. Thus, dedicated metal plates such as the conventional stainless steel plate (SUS plate) are not required.

The channel is defined by a plurality of flow guides provided integrally with at least one of the first and second seal members, at a position between the coolant flow field and the coolant gas passage. With the simple and economical structure, the power generation cell achieves the desired sealing performance and the desired power generation performance. The flow guides function as back support members.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
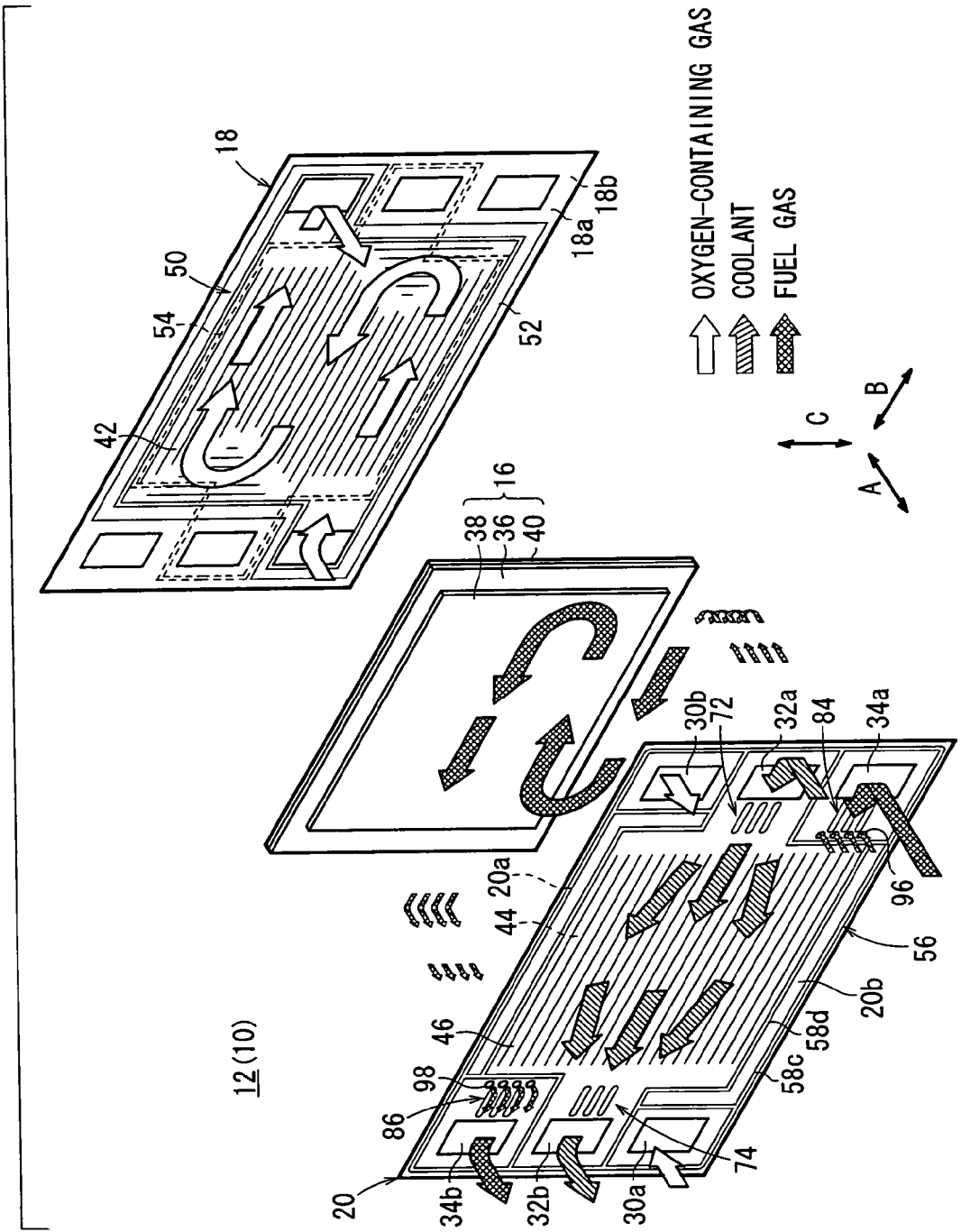
FIG. 1 is an exploded perspective view showing main components of a power generation cell of a fuel cell according to an embodiment of the present invention.
Figure 2:
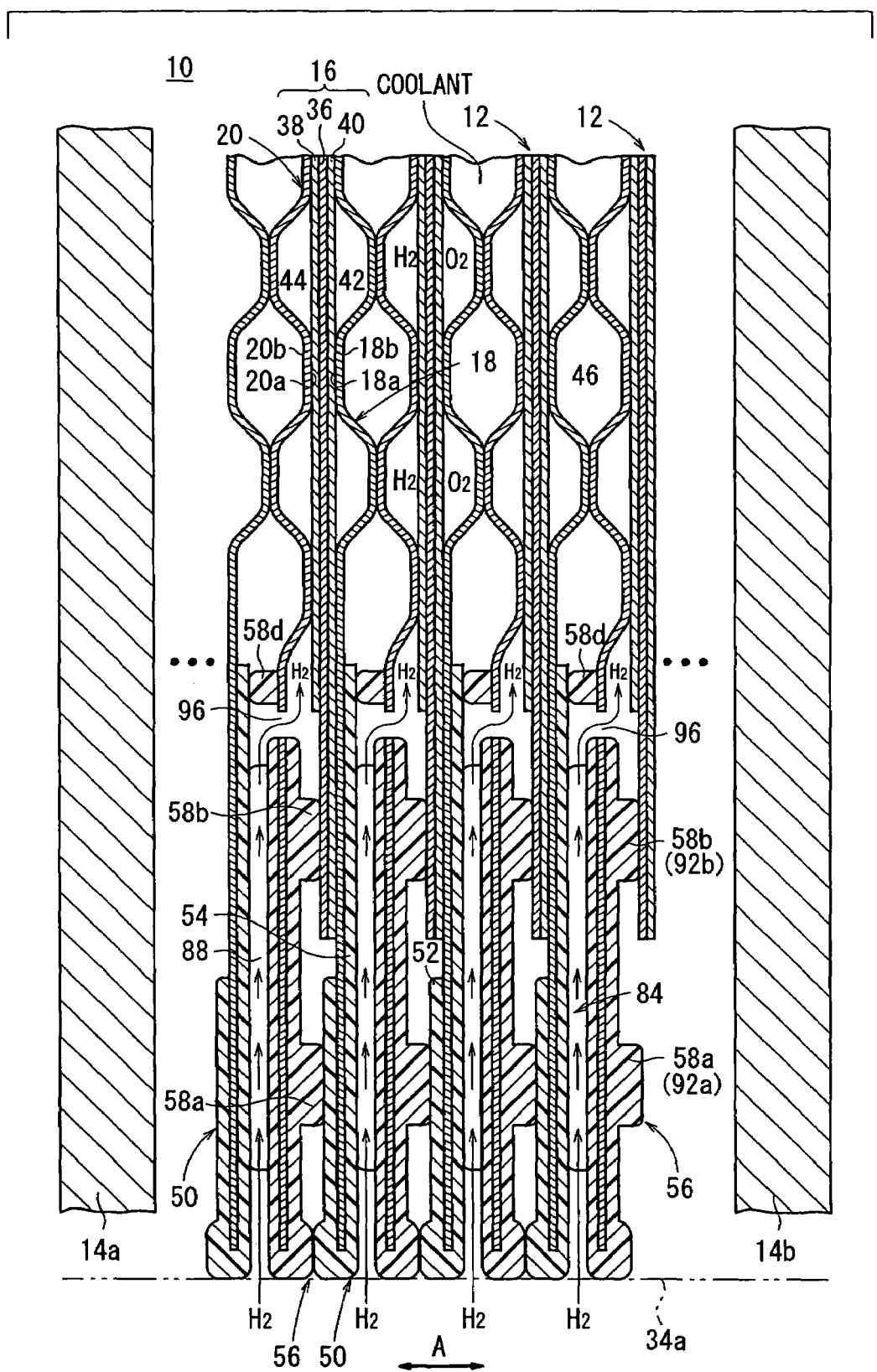
FIG. 2 is a cross sectional view showing main components in a part of the fuel cell.

FIG. 1 is an exploded perspective view showing main components of a power generation cell 12 of a fuel cell 10 according to an embodiment of the present invention. FIG. 2 is a cross sectional view showing a fuel cell 10 formed by stacking a plurality of the power generation cells 12 in a direction indicated by an arrow A.

Figure 3:
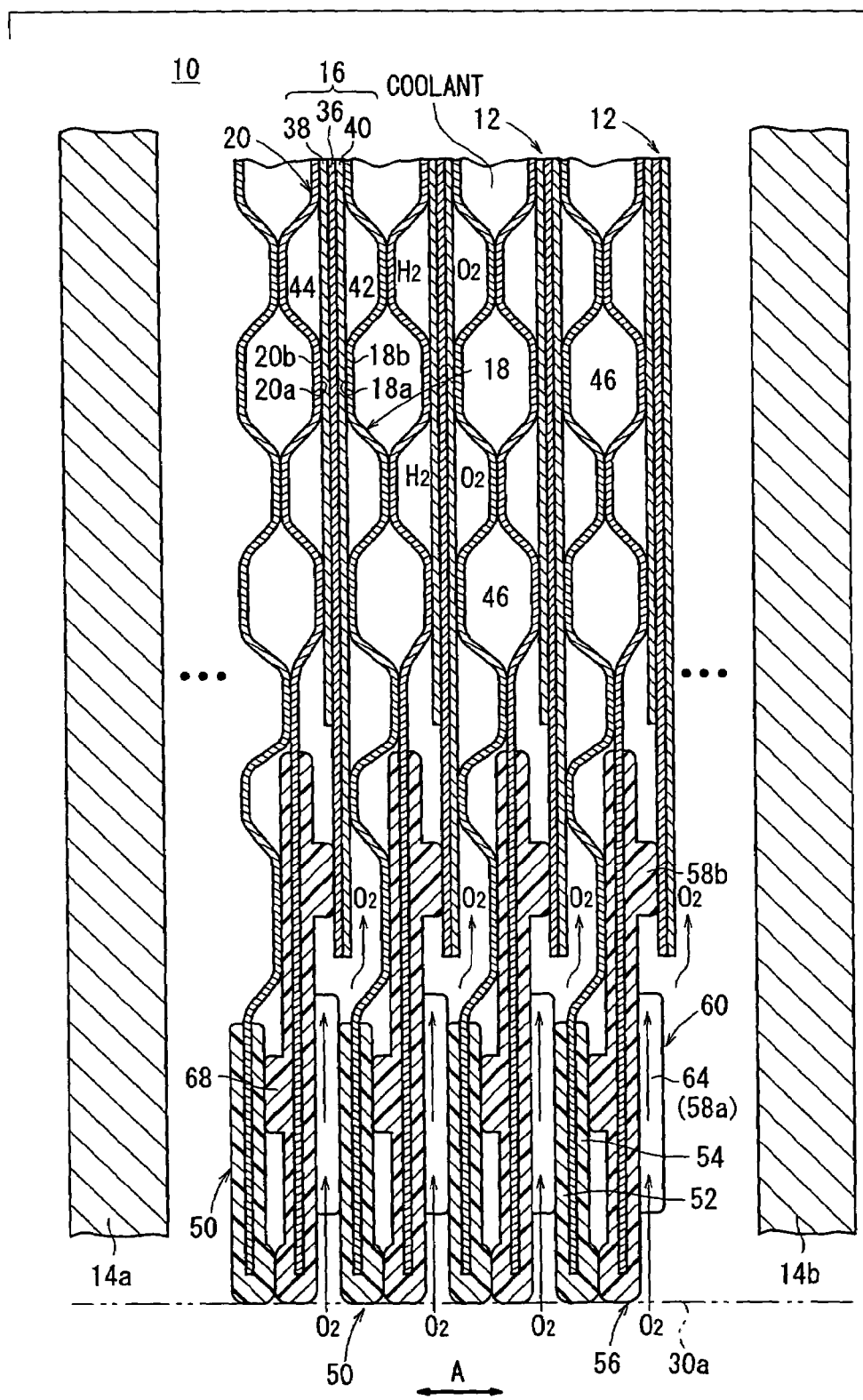
FIG. 3 is a cross sectional view showing main components in another part of the fuel cell.

As shown in FIGS. 2 and 3, the fuel cell 10 is formed by stacking the power generation cells 12 in the direction indicated by the arrow A. At opposite ends of the fuel cell 10 in the stacking direction, end plates 14a, 14b are provided. The end plates 14a, 14b are fixed to the fuel cell 10 by tie rods (not shown) for tightening the power generation cells 12 with a predetermined tightening force in the direction indicated by the arrow A.

As shown in FIG. 1, the power generation cell 12 includes a membrane electrode assembly (electrolyte electrode assembly) 16 and first and second metal separators 18, 20 sandwiching the membrane electrode assembly 16. For example, the first and second metal separators 18, 20 are steel plates, stainless steel plates, aluminum plates, plated steel sheets, or metal plates having anti-corrosive surfaces by surface treatment. The first and second metal separators 18, 20 have a thickness ranging from, e.g., 0.05 mm to 1.0 mm.

As shown in FIG. 1, at one horizontal end of the power generation cell 12 in a direction indicated by an arrow B, an oxygen-containing gas supply passage 30a for supplying an oxygen-containing gas, a coolant discharge passage 32b for discharging a coolant, and a fuel gas discharge passage 34b for discharging a fuel gas such as a hydrogen-containing gas are arranged vertically in a direction indicated by an arrow C. The oxygen-containing gas supply passage 30a, the coolant discharge passage 32b, and the fuel gas discharge passage 34b extend through the power generation cell 12 in the stacking direction indicated by the arrow A.

At the other horizontal end of the power generation cell 12 in the direction indicated by the arrow B, a fuel gas supply passage 34a for supplying the fuel gas, a coolant supply passage 32a for supplying the coolant, and an oxygen-containing gas discharge passage 30b for discharging the oxygen-containing gas are arranged vertically in the direction indicated by the arrow C. The fuel gas supply passage 34a, the coolant supply passage 32a, and the oxygen-containing gas discharge passage 30b extend through the power generation cell 12 in the direction indicated by the arrow A.

The membrane electrode assembly 16 comprises an anode 38, a cathode 40, and a solid polymer electrolyte membrane 36 interposed between the anode 38 and the cathode 40. The solid polymer electrolyte membrane 36 is formed by impregnating a thin membrane of perfluorosulfonic acid with water, for example. The surface area of the anode 38 is smaller than the surface area of the cathode 40.

Each of the anode 38 and cathode 40 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively.

The first metal separator 18 has an oxygen-containing gas flow field (reactant gas flow field) 42 on its surface 18a facing the membrane electrode assembly 16. The oxygen-containing gas flow field 42 includes a plurality of grooves extending in a serpentine pattern such that the oxygen-containing gas flows in the direction indicated by the arrow B, and turns upwardly, for example (see FIGS. 1 and 4). The oxygen-containing gas flow field 42 is connected to the oxygen-containing gas supply passage 30a at one end, and connected to the oxygen-containing gas discharge passage 30b at the other end. As shown in FIG. 5, the second metal separator 20 has a fuel gas flow field (reactant gas flow field) 44 on its surface 20a facing the membrane electrode assembly 16. The fuel gas flow field 44 includes a plurality of grooves extending in a serpentine pattern such that the fuel gas flows in the direction indicated by the arrow B, and turns upwardly. The fuel gas flow field 44 is connected to the fuel gas supply passage 34a at one end, and connected to the fuel gas discharge passage 34b at the other end.

Figure 6:
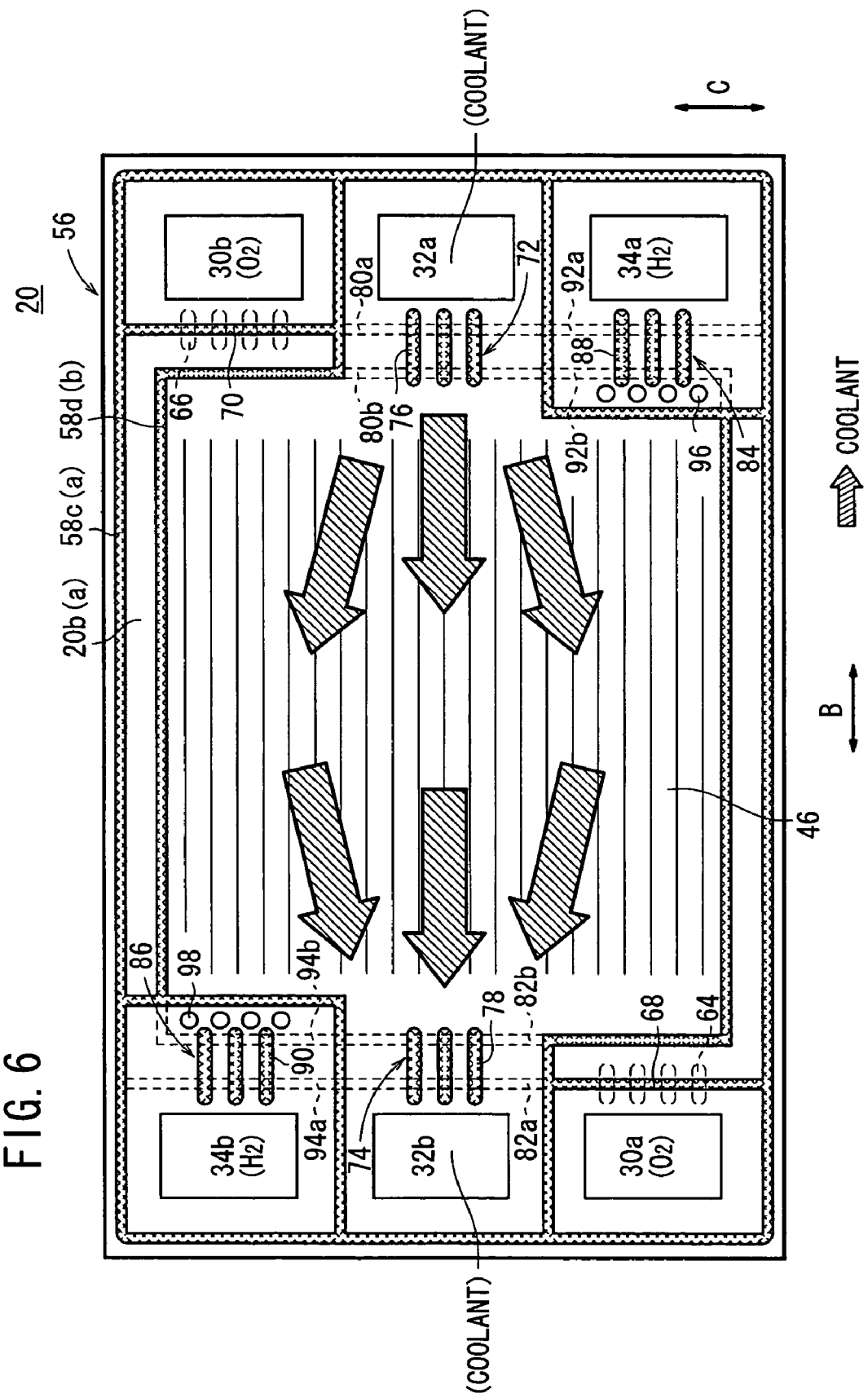
FIG. 6 is a front view showing the other surface of the second metal separator of the power generation cell.

As shown in FIGS. 1 and 6, a coolant flow field 46 is formed between a surface 18b of the first metal separator 18 and a surface 20b of the second metal separator 20. The coolant flow field 46 includes a plurality of grooves extending straight in the direction indicated by the arrow B. The coolant flow field 46 is connected to the coolant supply passage 32a at one end, and connected to the coolant discharge passage 32b at the other end.

Figure 4:
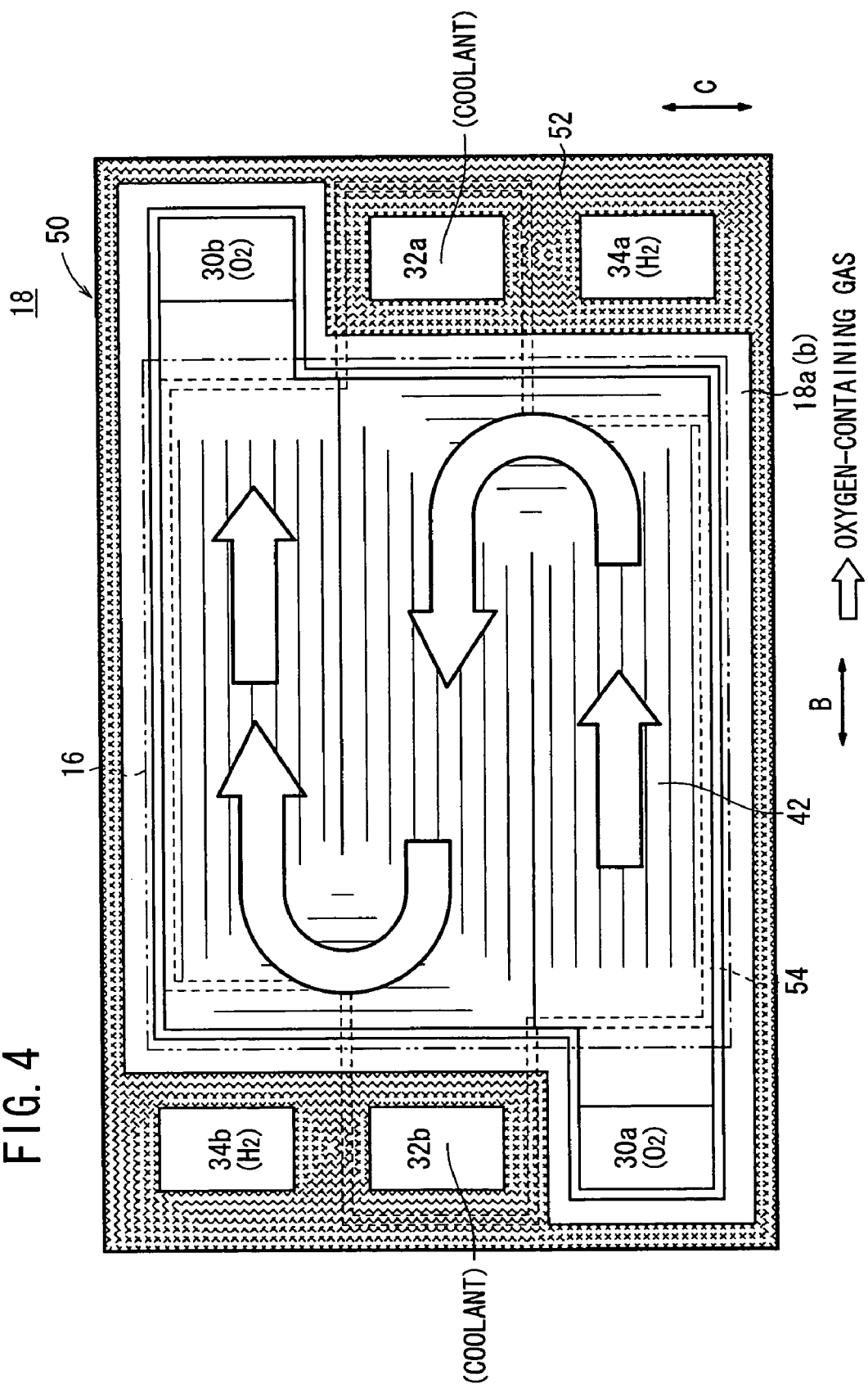
FIG. 4 is a front view showing a first metal separator of the power generation cell.
Figure 5:
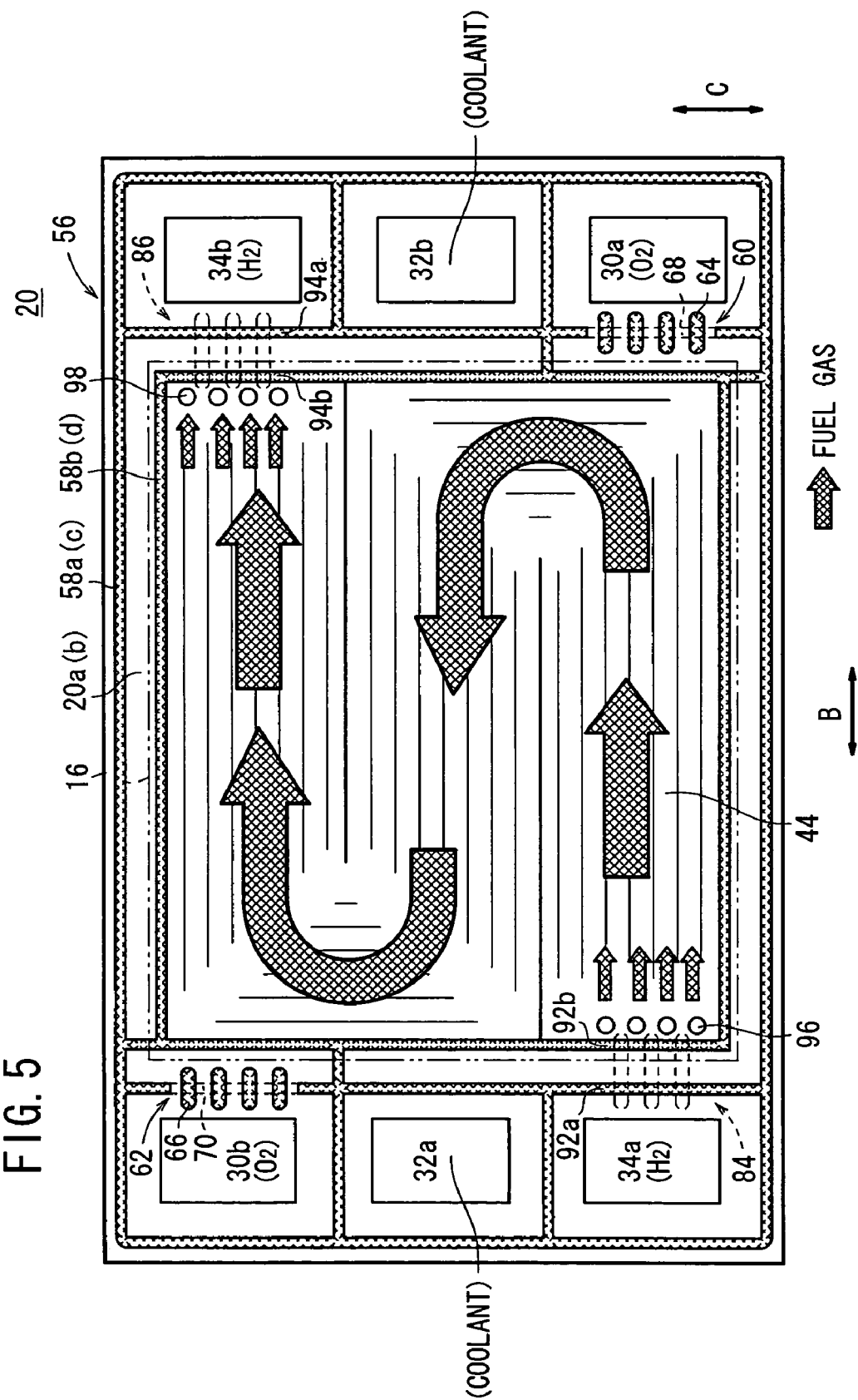
FIG. 5 is a front view showing one surface of a second metal separator of the power generation cell.

As shown in FIGS. 1 and 4, a first seal member 50 is formed integrally on the surfaces 18a, 18b of the first metal separator 18 to cover (sandwich) the outer edge of the first metal separator 18. The first seal member 50 is made of seal material, cushion material or packing material such as EPDM (Ethylene Propylene Diene Monomer), NBR (Nitrile Butadiene Rubber), fluoro rubber, silicon rubber, fluoro silicon rubber, butyl rubber (Isobutene-Isoprene Rubber), natural rubber, styrene rubber, chloroprene rubber, or acrylic rubber.

The first seal member 50 includes a first planar section 52 on the surface 18a of the first metal separator 18, and a second planar section 54 on the surface 18b of the first metal separator 18. The second planar section 54 is larger than the first planar section 52.

As shown in FIG. 2, the first planar section 52 is provided around the membrane electrode assembly 16 such that the first planar section 52 is spaced from an outer edge of the membrane electrode assembly 16. The second planar section 54 is provided around the membrane electrode assembly 16 such that the second planar section 54 partially overlaps the anode 40. As shown in FIG. 4, the first planar section 52 is not provided between the oxygen-containing gas supply passage 30a and the oxygen-containing gas flow field 42, and between the oxygen-containing gas discharge passage 30b and the oxygen-containing gas flow field 42. Thus, the oxygen-containing gas supply passage 30a and the oxygen-containing gas discharge passage 30b are connected to the oxygen-containing gas flow field 42. Further, the second planar section 54 is provided such that the coolant supply passage 32a is connected to the coolant discharge passage 32b.

As shown in FIG. 5, a second seal member 56 is formed integrally on the surfaces 20a, 20b of the second metal separator 20 to cover (sandwich) the outer edge of the second metal separator 20. Specifically, the second seal member 56 includes an outer seal (first seal) 58a provided on the surface 20a, and near the outer edge of the second metal separator 20, and an inner seal (first seal) 58b provided at a predetermined distance inwardly from the outer seal 58a.

The outer seal 58a and the inner seal 58b may have various shapes, including tapered shape (lip shape), trapezoid shape, or half-cylinder shape. The outer seal 58a is in contact with the first planar section 52 formed on the first metal separator 18, and the inner seal 58b is directly in contact with the solid polymer electrolyte membrane 36 of the membrane electrode assembly 16.

As shown in FIG. 5, the outer seal 58a is formed around the oxygen-containing gas supply passage 30a, the coolant discharge passage 32b, the fuel gas discharge passage 34b, the fuel gas supply passage 34a, the coolant supply passage 32a, and the oxygen-containing gas discharge passage 30b. The inner seal 58b is formed around the fuel gas flow field 44. The outer edge of the membrane electrode assembly 16 is positioned between the inner seal 58b and the outer seal 58a.

An outer seal (second seal) 58c corresponding to the outer seal 58a and an inner seal (second seal) 58d corresponding to the inner seal 58b are provided on the surface 20b of the second separator 20 (see FIG. 6). The shapes of the outer seal 58c and the inner seal 58d are similar to the shapes of the outer seal 58a and the inner seal 58b.

As shown in FIG. 5, the outer seal 58a has an inlet channel 60 connecting the oxygen-containing gas supply passage 30a and the oxygen-containing gas flow field 42. Further, the outer seal 58a has an outlet channel 62 connecting the oxygen-containing gas discharge passage 30b and the oxygen-containing gas flow field 42.

The inlet channel 60 is formed by a plurality of flow guides 64 arranged separately in the direction indicated by the arrow C. The flow guides 64 are oriented in the direction indicated by the arrow B. The flow guides 64 are in contact with the first planar section 52 to form passages for the oxygen-containing gas between the flow guides 64 (see FIG. 3). Likewise, the outlet channel 62 of the outer seal 58 is formed by a plurality of flow guides 66 oriented in the direction indicated by the arrow B. The flow guides 66 are in contact with the first planar section 52 to form passages for the oxygen-containing gas between the flow guides 66.

Figure 7:
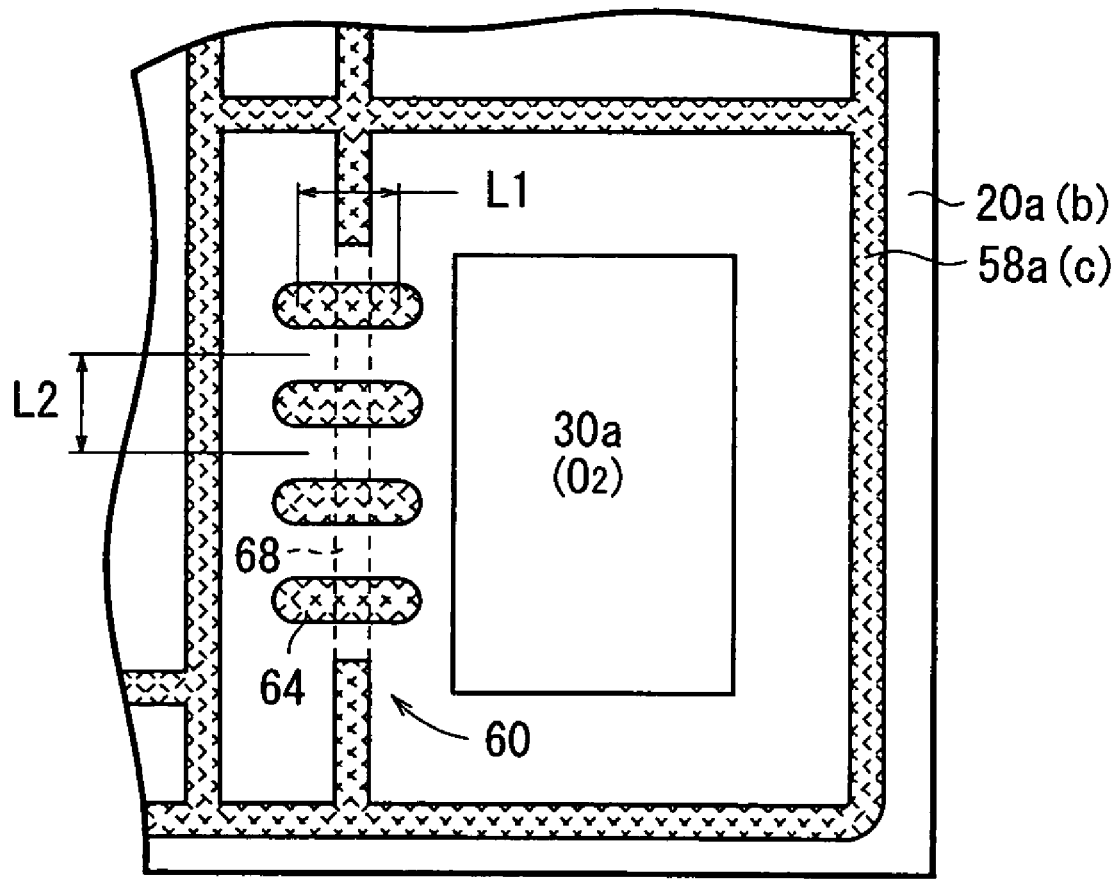
FIG. 7 is a view showing an inlet channel of the power generation cell for supplying an oxygen-containing gas.

As shown in FIG. 7, the flow guides 64 at the inlet channel 60 formed on the surface 20a of the second metal separator 20 overlap a section 68 of the outer seal 58c formed on the surface 20b of the second metal separator 20. Stated otherwise, the overlapping section 68 is part of the outer seal 58c which overlaps the flow guides 64 of the outer seal 58a such that the second metal separator 20 is sandwiched between the overlapping section 68 and the flow guides 64. The flow guides 64 are oriented perpendicularly to the overlapping section 68. Thus, the length of the flow guides 64 is larger than the seal width of the outer seal 58c. When a load is applied to the flow guides 64 and the overlapping section 68, the flow guides 64 and the seal overlapping sections 68 are deformed substantially equally in the stacking direction to the same extent.

Specifically, the line pressure of the flow guides 64 and the line pressure of the overlapping section 68 are substantially the same, i.e., the pressure load applied to the flow guides 64 per unit length, and the pressure load applied to the overlapping section 68 per unit length are substantially the same. The seal length L1 of the flow guides 64 and the seal length L2 of the overlapping section 68 are substantially the same. The seal length L2 is a partial length of the seal overlapping section 68, corresponding to the interval between the flow guides 64. As long as the flow guides 64 and the overlapping section 68 have substantially the same spring constant, the material of the flow guides 64 and material of the overlapping section 68 may be different. Therefore, various materials can be used for the flow guides 64 and the overlapping section 68.

The outlet channel 62 and the inlet channel 60 have substantially the same structure. The flow guides 64 on the surface 20a of the second metal separator 20 overlap a seal section 70 of the outer seal 58c formed on the surface 20b of the second metal separator 20. When a load is applied to the flow guides 64 and the seal overlapping section 70 in the stacking direction, the flow guides 64 and the overlapping section 70 are substantially equally deformed in the stacking direction to the same extent (see FIG. 5).

As shown in FIG. 6, an inlet channel 72 connecting the coolant supply passage 32a and the coolant flow field 46, and an outlet channel 74 connecting the coolant discharge passage 32b and the coolant flow field 46 are formed on the surface 20b of the second metal separator 20. The inlet channel 72 is formed by a plurality of flow guides 76 arranged separately in the direction indicated by the arrow B as part of the outer seal 58c and the inner seal 58d. The flow guides 78 are oriented in the direction indicated by the arrow C. Likewise, the outlet channel 74 is formed by a plurality of flow guides 78 arranged separately in the direction indicated by the arrow C as part of the outer seal 58c and the inner seal 58d. The flow guides 76, 78 are in contact with the second planar section 54, and passages for the coolant is formed between the flow guides 76, 78, respectively.

Figure 8:
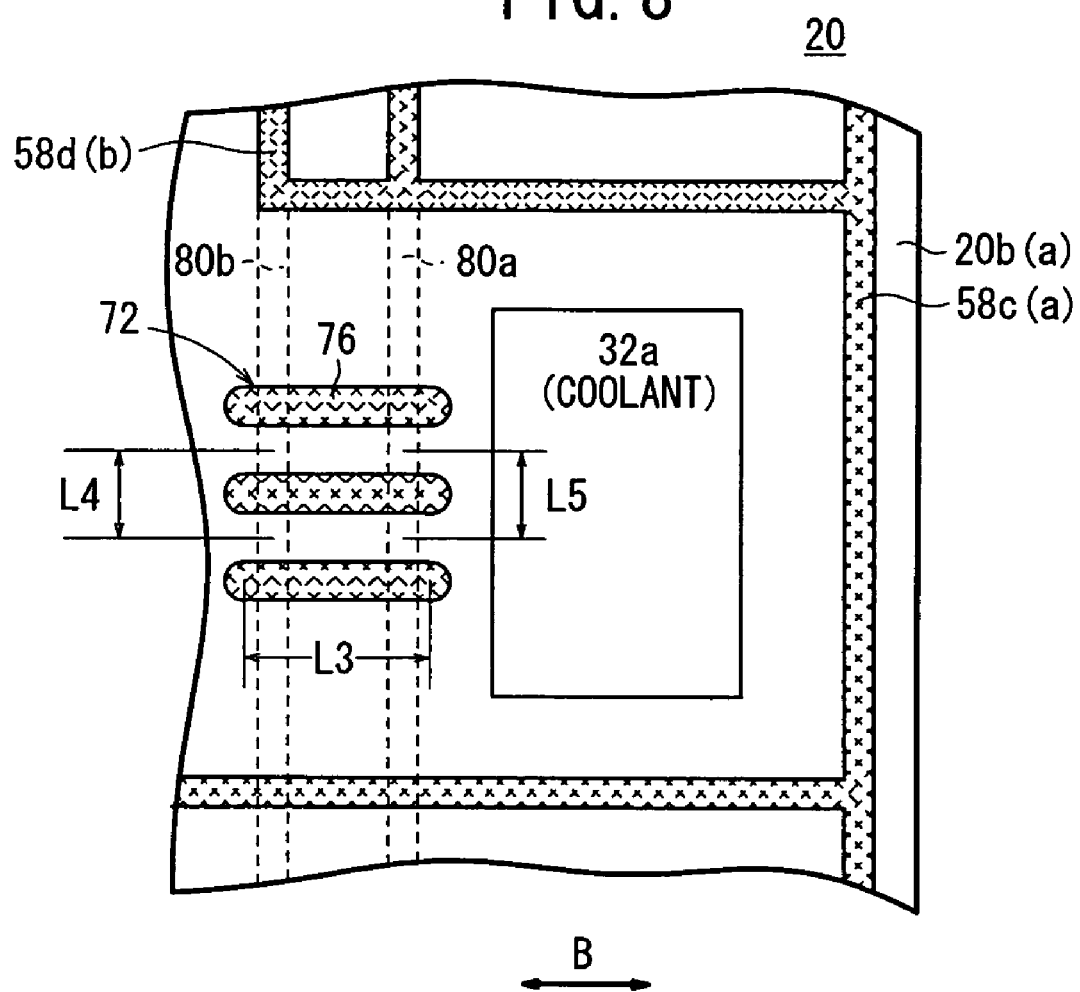
FIG. 8 is a view showing an inlet channel of the power generation cell for supplying a coolant.

As shown in FIG. 8, the flow guides 76 of the inlet channel 72 on the surface 20b of the second metal separator 20 overlap a section 80a of the outer seal 58a and a section 80b of the inner seal 58b on the surface 20a such that the second metal separator 20 is sandwiched between the flow guides 76 and the overlapping sections 80a, 80b. When a load is applied to the flow guides 76 of the inlet channel 72 and the overlapping sections 80a, 80b in the stacking direction, the flow guides 76 and the overlapping sections 80a, 80b are substantially equally deformed to the same extent. The seal length L3 is equal to the sum of the seal length L4 of the overlapping section 80a and the seal length L5 of the overlapping section 80b (L3=L4+L5). The seal length L4 is a partial length of the seal overlapping section 80a, corresponding to the interval between the flow guides 76, and the seal length L5 is a partial length of the overlapping section 80b, corresponding to the interval between the flow guides 76. In FIG. 8, each of the flow guides 76 overlaps both of the overlapping sections 80a, 80b. Alternatively, the flow guides 76 may be provided separately such that one flow guide 76 overlap only one of the overlapping sections 80a, 80b.

Likewise, as shown in FIG. 6, the flow guides 78 on the surface 20a of the second metal separator 20 overlap a section 82a of the outer seal 58a and a section 82b of the inner seal 58b such that the second metal separator 20 is sandwiched between the flow guides 78 and the overlapping sections 82a, 82b. When a load is applied to the flow guides 78 and the overlapping sections 82a, 82b in the stacking direction, the flow guides 78 and the overlapping sections 82a, 82b are deformed substantially equally at a same extent.

As shown in FIG. 6, an inlet channel 84 is provided near the fuel gas supply passage 34a, and an outlet channel 86 is provided near the fuel gas discharge passage 34b. The inlet channel 84 is formed by a plurality of flow guides 88 arranged in the direction indicated by the arrow C. The outlet channel 86 is formed by a plurality of flow guides 90 arranged in the direction indicated by the arrow C. The flow guides 88, 90 are in contact with the second planar section 54, and form passages for the fuel gas between the flow guides 88 and 90, respectively.

The flow guides 88 overlap a section 92a of the outer seal 58a and a section 92b of the inner seal 58b such that the second metal separator 20 is sandwiched between the flow guides 88 and the overlapping sections 92a, 92b. Likewise, the flow guides 90 overlap a section 94a of the outer seal 58a and a section 94b of the inner seal 58b such that the second metal separator 20 is sandwiched between the flow guides 90 and the overlapping sections 94a, 94b.

The inlet channel 84 and the outlet channel 86 have the same structure as the inlet channel 72. When a load is applied to the flow guides 88 and the overlapping sections 92a, 92b, and the flow guides 90 and the overlapping sections 94a, 94b in the stacking direction, the flow guides 88 and the overlapping sections 92a, 92b, and the flow guides 90 and the overlapping sections 94a, 94b are deformed substantially equally to the same extent. A plurality of supply holes 96 and discharge holes 98 are provided outside the inner seal 58d, near the inlet channel 84 and the outlet channel 86, respectively. The supply holes 96 extend through the second separator 20, and are connected to the inlet of the fuel gas flow field 44. The discharge holes 98 extend through the second separator 20, and are connected to the outlet of the fuel gas flow field 44. The inlet and outlet of the fuel gas flow field 44 are positioned inside the inner seal 58b on the surface 20a of the second metal separator 20 (see FIG. 5).

Operation of the fuel cell 10 will be described below.

As shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, an ethylene glycol or an oil is supplied to the coolant supply passage 32a.

The oxygen-containing gas flows from the oxygen-containing gas supply passage 30a into the oxygen-containing gas flow field 42 of the first metal separator 18 (see FIG. 3). Then, the oxygen-containing gas flows in a serpentine pattern in the direction indicated by the arrow B, and moves upwardly along the cathode 40 of the membrane electrode assembly 16 for inducing an electrochemical reaction at the cathode 40. The fuel gas flows from the fuel gas supply passage 34a into the fuel gas flow field 44 of the second metal separator through the supply holes 96 (see FIG. 2). The fuel gas flows in a serpentine pattern in the direction indicated by the arrow B, and moves upwardly along the anode 38 of the membrane electrode assembly 16 for inducing an electrochemical reaction at the anode 38.

Thus, in the membrane electrode assembly 16, the oxygen-containing gas supplied to the cathode 40, and the fuel gas supplied to the anode 38 are consumed in the electrochemical reactions at catalyst layers of the cathode 40 and the anode 38 for generating electricity.

After the oxygen in the oxygen-containing gas is consumed at the cathode 40, the oxygen-containing gas is discharged into the oxygen-containing gas discharge passage 30b in the direction indicated by the arrow A. Likewise, after the fuel gas is consumed at the anode 38, the fuel gas is discharged through the discharge holes 98 into the fuel gas discharge passage 34b in the direction indicated by the arrow A.

The coolant from the coolant supply passage 32a flows into the coolant flow field 46 between the first and second metal separators 18, 20, and flows in the direction indicated by the arrow B for cooling the membrane electrode assembly 16. Then, the coolant is discharged into the coolant discharge passage 32b.

In the present embodiment, the inlet channel 60 including the flow guides 64 are provided on the surface 20a of the second metal separator 20 for smoothly supplying the oxygen-containing gas from the oxygen-containing gas supply passage 30a to the oxygen-containing gas flow field 42. As shown in FIG. 5, the flow guides 64 of the inlet channel 60 are part of the outer seal 58b, and the section 68 on the surface 20b of the second separator 20 overlaps the flow guides 64 of the inlet channel 60. The overlapping section 68 is part of the outer seal 58c. The overlapping section 68 and the flow guides 64 are resilient, and deform easily.

As shown in FIG. 7, the line pressure of the flow guides 64 of the inlet channel 60 and the line pressure of the overlapping section 68 are substantially the same. The seal length L1 of the flow guides 64 and the seal length L2 of the overlapping section 68 are substantially the same. Therefore, when a load is applied to the flow guides 64 and the overlapping section 68 provided opposite surfaces 20a, 20b of the metal separator 20 in a stacking direction of the power generation cells 12, the flow guides 64 and the overlapping section 68 are deformed equally in the stacking direction to the same extent.

Figure 9:
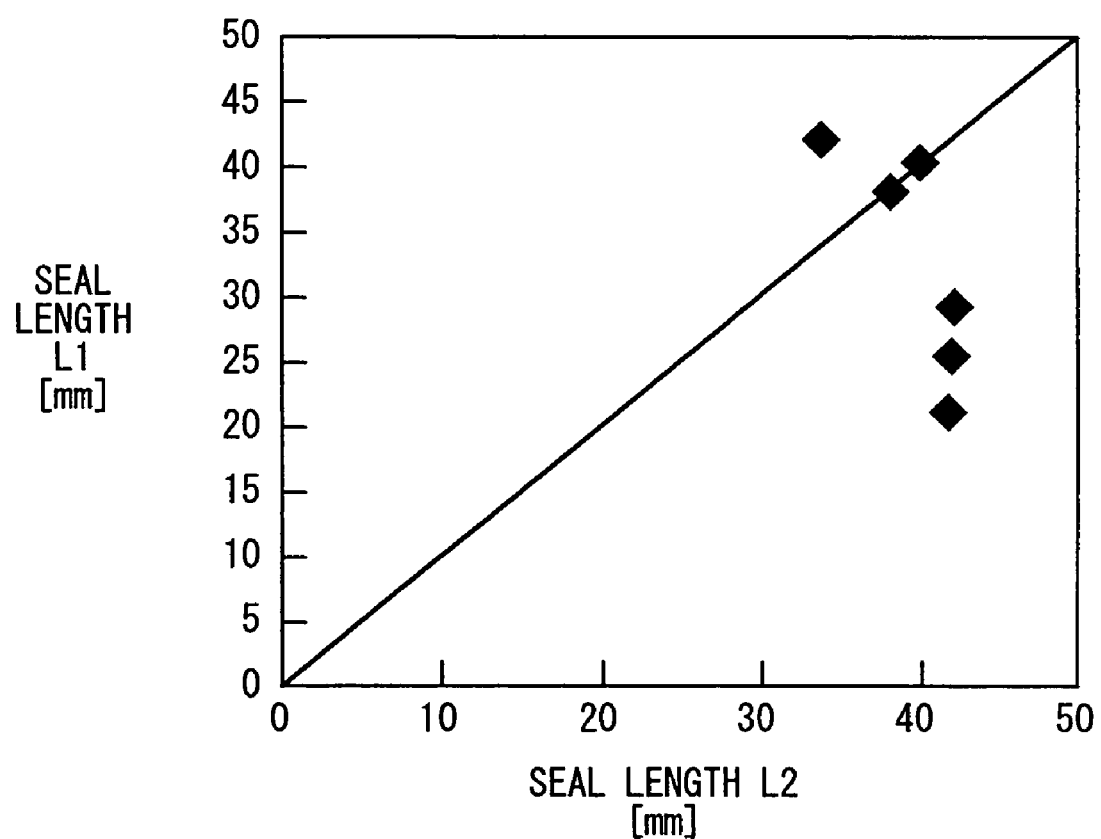
FIG. 9 is a view showing relationship between a seal length L1 and a seal length L2.
Figure 10:
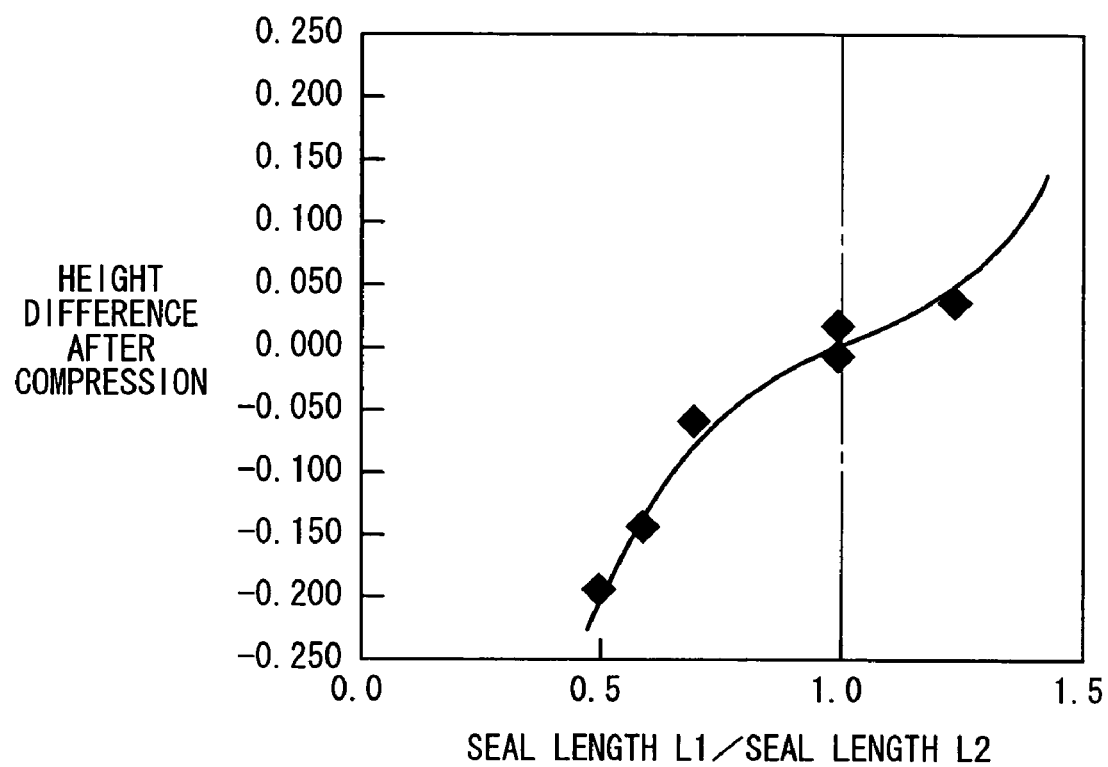
FIG. 10 is a view showing the height difference after compression in contrast to the ratio between the seal length L1 and the seal length L2.
Figure 11:
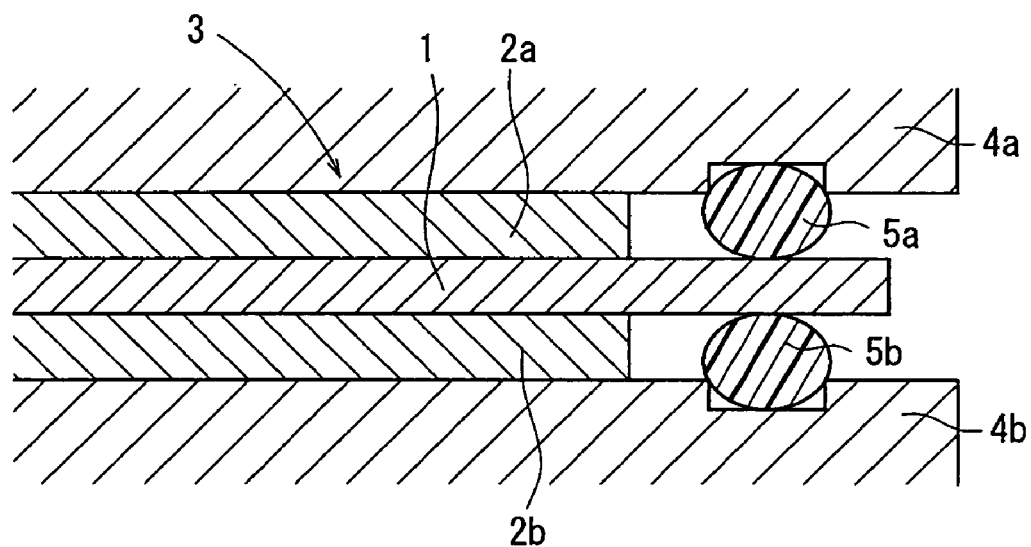
FIG. 11 is a view showing a sealing structure disclosed in Japanese laid-open patent publication No. 8-148169.
Figure 12:
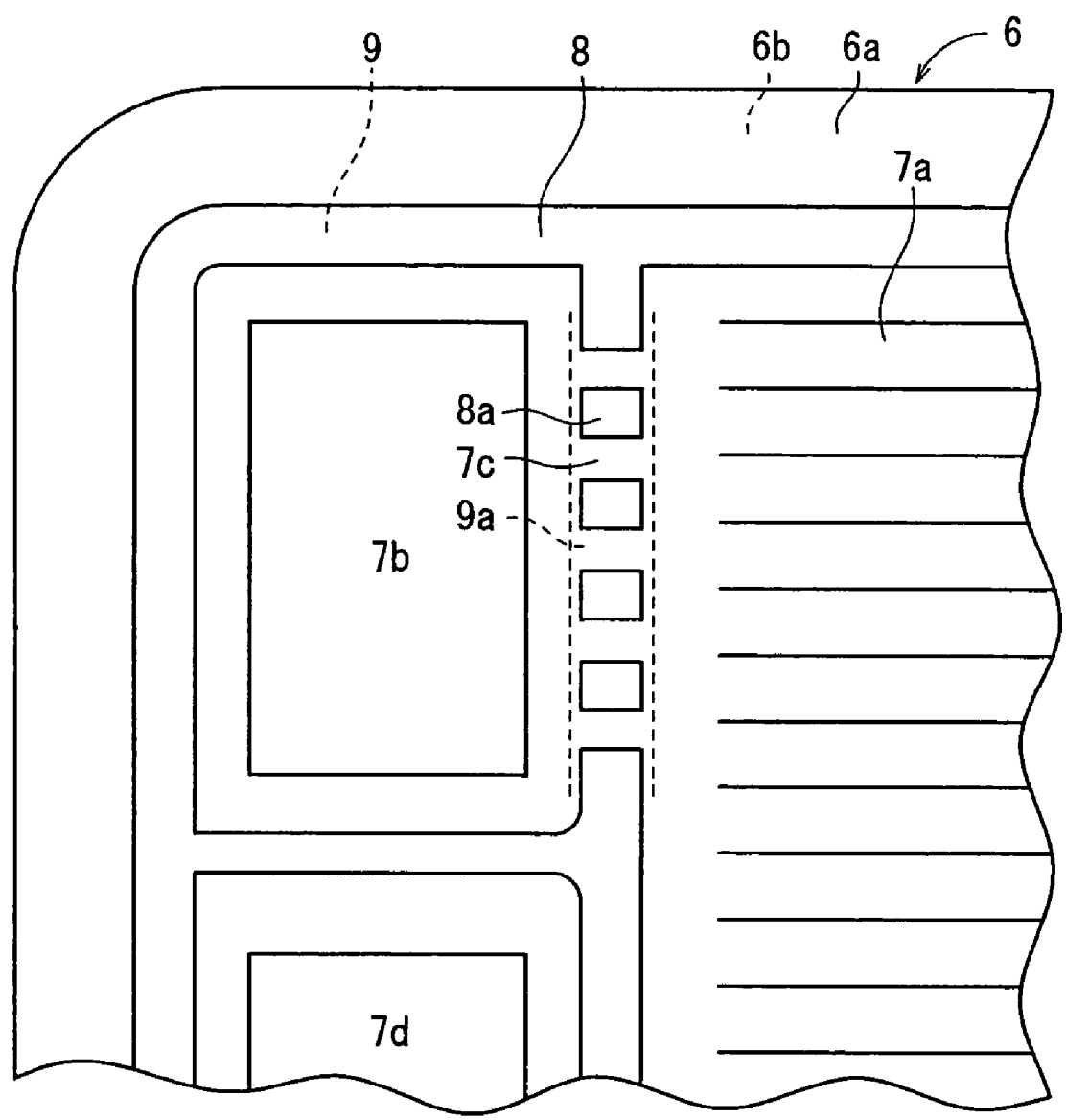
FIG. 12 is a view showing a part of a conventional separator.
Figure 13:
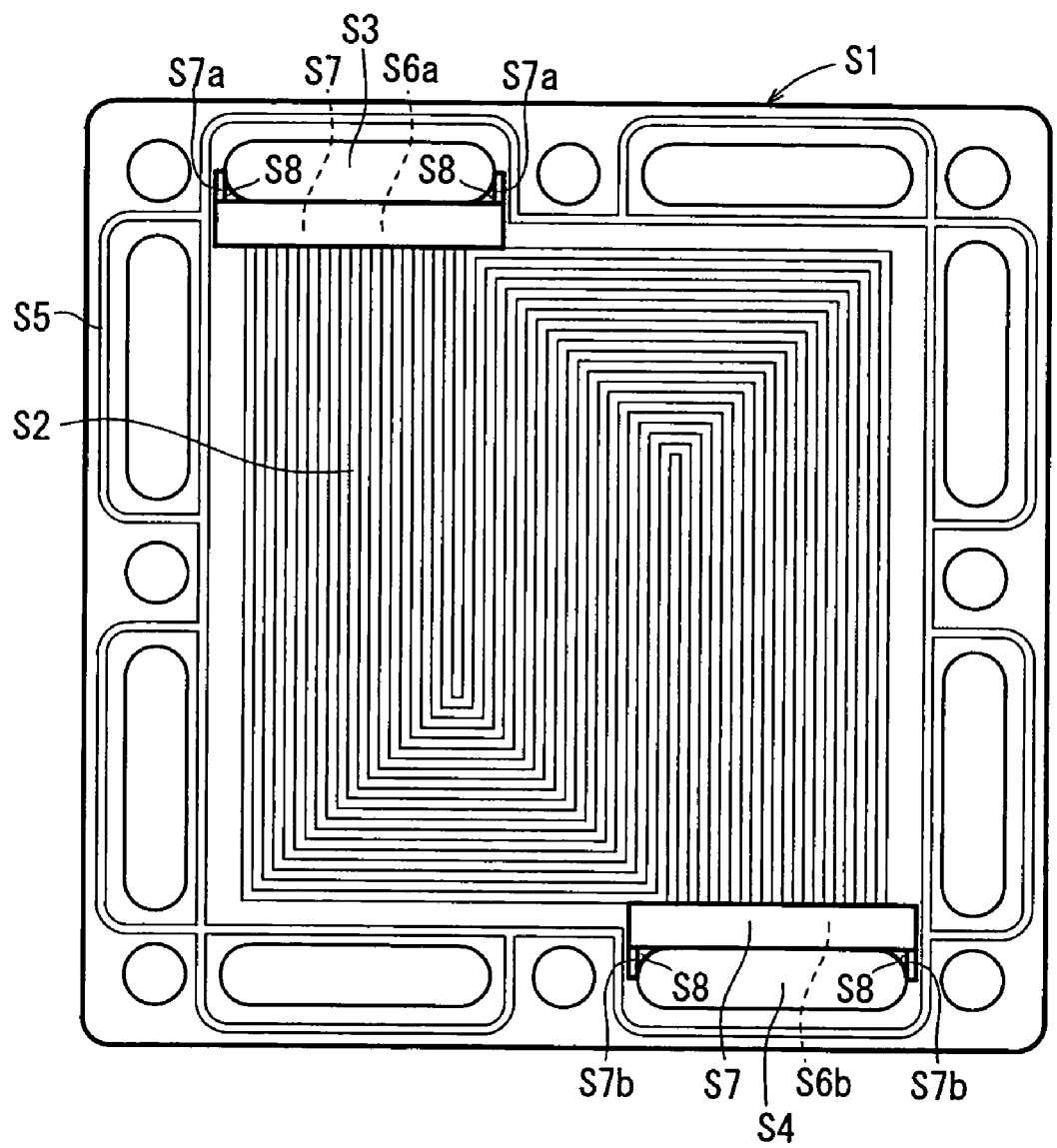
FIG. 13 is a view showing a sealing structure disclosed in Japanese laid-open patent publication No. 2001-266911.

Specifically, when the seal length L1 of the flow guides 64 and the seal length L2 of the overlapping section 68 are changed as shown in FIG. 9, the height difference in contrast to the ratio between the seal length and the seal length changes as shown in FIG. 10. The height difference is the difference between the height of the flow guides 64 and the height of the overlapping section 68 after compression by applying the load to the flow guides 64 and the overlapping section 68 in the stacking direction. If the ratio of the seal length L1 and the seal length L2 (L1/L2) is about 1.0, i.e., the seal length L1 is equal to the seal length L2, the height difference is zero.

The flow guides 64 and the overlapping section 68 on both surfaces 20a, 20b of the second metal separator 20 are deformed substantially equally to the same extent. The line pressure (load) applied to the second metal separator 20 is well-balanced, and thus, the second metal separator 20 is not deformed undesirably. The flow guides 64 of the inlet channel 60 are deformed uniformly. Thus, the oxygen-containing gas is supplied from the oxygen-containing gas supply passage 30a to the oxygen-containing gas flow field 42 smoothly.

The outlet channel 62 has substantially the same structure as the inlet channel 60. When a load is applied to the flow guides 66 and the overlapping section 70 provided opposite surfaces 20a, 20b of the metal separator 20 in the stacking direction, the flow guides 66 and the overlapping section 70 are deformed substantially equally in the stacking direction to the same extent. Thus, the second metal separator 20 is not deformed undesirably, and the exhaust gas (the consumed oxygen-containing gas) is reliably discharged from the oxygen-containing gas flow field 42 to the oxygen-containing gas discharge passage 30b.

As shown in FIG. 6, the second metal separator 20 has the inlet channel 72 on the surface 20b for connecting the coolant supply passage 32a and the coolant flow field 46. The flow guides 76 of the inlet channel 72 and the sections 80a, 80b on the opposite surface 20b of the second metal separator 20 are overlapped with each other. When a load is applied to the flow guides 76 of the inlet channel 72 and the overlapping sections 80a, 80b, the flow guides 76 and the overlapping sections 80a, 80b are deformed substantially equally in the stacking direction to the same extent. As shown in FIG. 8, the seal length L3 of the flow guides 76 is equal to the sum of the seal length L4 of the of the overlapping section 80a and the seal length L5 of the overlapping section 80b (L3=L4+L5).

Since the flow guides 76 of the inlet channel 72 and the overlapping sections 80a, 80b are deformed substantially equally to the same extent, the second metal separator 20 between flow guides 76 of the inlet channel 72 and the overlapping sections 80a, 80b is not deformed. Consequently, the coolant is supplied smoothly from the coolant supply passage 32a to the coolant flow field 46.

The outlet channel 74 has substantially the same structure as the inlet channel 72. The flow guides 78 and sections 82a, 82b are deformed substantially equally to the same extent. Therefore, the coolant is discharged into the coolant discharge passage 32b smoothly.

As shown in FIG. 6, the inlet channel 84 connects the fuel gas supply passage 34a and the fuel gas flow field 44, and the outlet channel 86 connects the fuel gas discharge passage 34b and the fuel gas flow field 44. The flow guides 88, 90, and the overlapping sections 92a, 92b, 94a, 94d are deformed substantially equally to the same extent. Therefore, the fuel gas is smoothly supplied from the fuel gas supply passage 34a to the fuel gas flow field 44, and smoothly discharged from the fuel gas flow field 44 to the fuel gas discharge passage 34b. The second metal separator 20 is not deformed undesirably.

According to the present embodiment, the power generation in the fuel cell 10 is performed stably. With the simple structure, the flow rates of the fuel gas, the oxygen-containing gas, and the coolant are stably maintained at the desired levels, respectively. Consequently, the power generation is stably performed in each of the power generation cells 12.

According to the present embodiment, as shown in FIG. 3, the flow guides 64 are in contact with the first planar section 52 formed on the surface 18a of the first metal separator 18 to form passages for the oxygen-containing gas between the flow guides 64.

The inlet channel 60 is covered by part (flow guides 64) of the second seal member 56 and part (first planar section 52) of the first seal member 50. Thus, dedicated metal plates such as the conventional stainless steel plate (SUS plate) are not required for covering the inlet channel 60, and it not required to attach such metal plate. Thus, the fuel cell 10 is assembled simply, and produced at a low cost, while the desired sealing performance is achieved.

The size of the inlet channel 60 is small. Therefore, the surface area of the power generation cell 12 is used efficiently, and the power generation in the fuel cell 10 is performed efficiently.

The flow guides 64 of the inlet channel 60 are formed on the second seal member 56. With the simple and economical structure, the power generation cell 12 achieves the desired sealing performance and the desired power generation performance. The flow guides 64 functions as back support members for maintaining the pressure applied to the section 60 of the outer seal 58c at the required level for sealing.

The outlet channel 62 has the similar functions as the inlet channel 60. Further, the inlet channels 72, 84, and the outlet channels 74, 86 have the similar functions.

The first seal member 50 and the second seal member 56 are in contact with each other to form the inlet channel 60. Alternatively, the channel may be defined between a planar seal and a ridge-shaped seal, between ridge-shaped seals, between a planar seal and a circular or rectangular boss, or between bosses.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking a plurality of power generation cells in a stacking direction, wherein each of said plurality of power generation cells includes an electrolyte electrode assembly and separators sandwiching said electrolyte electrode assembly, said electrolyte electrode assembly an anode, a cathode and an electrolyte interposed between said anode and said cathode, wherein a reactant gas flow field is formed along an electrode surface for supplying a reactant gas through said reactant gas flow field;

a coolant flow field is formed between said power generation cells for supplying a coolant through said coolant flow field;

a reactant gas passage extends through said power generation cells, and is connected to said reactant gas flow field;

a coolant passage extends through said power generation cells, and is connected to said coolant flow field;

a first seal member is provided integrally on a top surface and a bottom surface of a cathode side separator, wherein the first seal member extends over the top surface to the bottom surface of the cathode side separator so as to wrap around the cathode side separator, the top surface is spaced apart from and parallel to the bottom surface, the top surface and the bottom surface of the cathode side separator extend in a direction perpendicular to the stacking direction;

a second seal member is provided integrally on a top surface and a bottom surface of an anode side separator, wherein the second seal member extends over the top surface to the bottom surface of the anode side separator as to wrap around the anode side separator, the top surface is spaced apart from and parallel to the bottom surface, the top surface and the bottom surface of the anode side separator extend in a direction perpendicular to the stacking direction;

said first seal member and said second seal member are in contact with each other, and a channel connecting said reactant gas flow field and the reactant gas passage is formed between said first seal member and said second seal member;

wherein said electrolyte is an electrolyte membrane, and a surface area of said anode is smaller than a surface area of said cathode; and said second seal member includes an inner seal provided between said electrolyte membrane and said anode side separator, and an outer seal provided between adjacent separators.

2. A fuel cell according to claim 1, wherein said channel is defined by a plurality of flow guides provided integrally with at least one of said first and second seal members, at a position between said reactant gas flow field and said reactant gas passage.

3. A fuel cell according to claim 1, wherein said second seal member further includes:

another inner seal corresponding to said inner seal; and another outer seal corresponding to said outer seal.

4. A fuel cell formed by stacking a plurality of power generation cells in a stacking direction, wherein each of said plurality of power generation cells includes an electrolyte electrode assembly and separators sandwiching said electrolyte electrode assembly, said electrolyte electrode assembly including an anode, a cathode and an electrolyte interposed between said anode and said cathode, wherein a reactant gas flow field is formed along an electrode surface for supplying a reactant gas through said reactant gas flow field;

a coolant flow field is formed between said power generation cells for supplying a coolant through said coolant flow field;

a reactant gas passage extends through said power generation cells, and is connected to said reactant gas flow field;

a coolant passage extends through said power generation cells, and is connected to said coolant flow field;

a first seal member is provided integrally on a top surface and a bottom surface of a cathode side separator, wherein the first seal member extends over the top surface to the bottom surface of the cathode side separator as to wrap around the cathode side separator, the top surface is spaced apart from and parallel to the bottom surface, the top surface and the bottom surface of the cathode side separator extend in a direction perpendicular to the stacking direction;

a second seal member is provided integrally on a top surface and a bottom surface of an anode side separator, wherein the second seal member extends over the top surface to the bottom surface of the anode side separator as to wrap around the anode side separator, the top surface is spaced apart from and parallel to the bottom surface, the top surface and the bottom surface of the anode side separator extend in a direction perpendicular to the stacking direction;

said first seal member and said second seal member are in contact with each other, and a channel connecting said coolant flow field and the coolant flow passage is formed between said first seal member and second seal member;

wherein said electrolyte is an electrolyte membrane, and a surface area of said anode is smaller than a surface area of said cathode; and said second seal member includes an inner seal provided between said electrolyte membrane and said anode side separator, and an outer seal provided between adjacent separators.

5. A fuel cell according to claim 4, wherein said channel is defined by a plurality of flow guides provided integrally with at least one of said first and second seal members, at a position between said coolant flow field and said coolant passage.

6. A fuel cell according to claim 4, wherein said second seal member includes:

another inner seal corresponding to said inner seal; and another outer seal corresponding to said outer seal.

* * * * *